United States Patent
Kim et al.

(10) Patent No.: US 9,152,256 B2
(45) Date of Patent: Oct. 6, 2015

(54) TOUCH SCREEN AND METHOD OF MANUFACTURING THE SAME

(75) Inventors: Gap Young Kim, Seoul (KR); Hyun Min Na, Seoul (KR); Hyuk Jin Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 394 days.

(21) Appl. No.: 13/129,355

(22) PCT Filed: Nov. 13, 2009

(86) PCT No.: PCT/KR2009/006669
§ 371 (c)(1),
(2), (4) Date: Oct. 26, 2011

(87) PCT Pub. No.: WO2010/056055
PCT Pub. Date: May 20, 2010

(65) Prior Publication Data
US 2012/0038564 A1    Feb. 16, 2012

(30) Foreign Application Priority Data

Nov. 14, 2008  (KR) ................. 10-2008-0113677

(51) Int. Cl.
*G06F 3/041* (2006.01)

(52) U.S. Cl.
CPC ...... *G06F 3/041* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 6,057,903 A | * | 5/2000 | Colgan et al. | 349/139 |
| 6,323,051 B1 | * | 11/2001 | Shimada | 438/30 |
| 6,329,044 B1 | * | 12/2001 | Inoue et al. | 428/209 |
| 6,485,839 B1 | * | 11/2002 | Nagarkar et al. | 428/461 |
| 2001/0018238 A1 | | 8/2001 | Kim | |
| 2002/0149438 A1 | * | 10/2002 | Isoda | 333/1.1 |
| 2003/0035906 A1 | * | 2/2003 | Memarian et al. | 428/1.3 |
| 2003/0087119 A1 | | 5/2003 | Iwabuchi et al. | |
| 2003/0175411 A1 | * | 9/2003 | Kodas et al. | 427/58 |
| 2004/0027339 A1 | | 2/2004 | Schulz | |
| 2004/0165005 A1 | * | 8/2004 | Yoshikawa et al. | 345/702 |
| 2004/0187917 A1 | * | 9/2004 | Pichler | 136/263 |

(Continued)

FOREIGN PATENT DOCUMENTS

| | | |
|---|---|---|
| CN | 1350658 A | 5/2002 |
| EP | 1220234 A1 | 7/2002 |

(Continued)

OTHER PUBLICATIONS

Choi, J.H. et al. "Work Function increase of indium—tin—oxide surfaces by atmospheric air plasma treatment with steady-state ariflow" *J. Vac. Sci. Technol. A*, Sep./Oct. 2005, 23(5): 1479-1482.

(Continued)

*Primary Examiner* — Elizabeth A Robinson
*Assistant Examiner* — Daniel D Lowrey
(74) *Attorney, Agent, or Firm* — Saliwanchik, Lloyd & Eisenschenk

(57) ABSTRACT

A touch screen and a method for manufacturing the touch screen are provided. The touch screen can include: an ITO (Indium Tin Oxide) film deposited on the upper surface of a flexible plastic film; a primary metal layer deposited on the ITO film; and a secondary metal film plated on the primary metal layer. The touch screen is durable and has excellent sensitivity.

9 Claims, 2 Drawing Sheets

(56) References Cited

U.S. PATENT DOCUMENTS

2006/0121701 A1* 6/2006 Basol .................... 438/483
2008/0165139 A1* 7/2008 Hotelling et al. ........... 345/173

FOREIGN PATENT DOCUMENTS

| | | |
|---|---|---|
| JP | H10112597 A | 4/1998 |
| JP | 2003-151366 A | 5/2003 |
| JP | 2003-197035 A | 7/2003 |
| JP | 2005-535548 A | 11/2005 |
| JP | 2006-045315 A | 2/2006 |
| JP | 2006-168005 A | 6/2006 |
| JP | 2007-158182 A | 6/2007 |
| JP | 2008-009921 A | 1/2008 |
| JP | 2008-077574 A | 4/2008 |
| JP | 2008-080743 A | 4/2008 |
| JP | 2008-207401 A | 9/2008 |
| KR | 10-2005-0028377 A | 3/2005 |
| KR | 10-2007-0009724 A | 1/2007 |
| WO | WO-00/70405 A1 | 11/2000 |
| WO | WO-2007/056224 A2 | 5/2007 |

OTHER PUBLICATIONS

Kim, H.J. et al. "Properties of amorphous tin-doped indium oxide thin films deposited by $O_2$/Ar mixture ion beam-assisted system at room temperature" *Surface and Coatings Technology*, 2000, 131:201-205.

Supplementary European Search Report dated Feb. 27, 2013 in European Application No. 09826287.6, filed Nov. 13, 2009.

Office Action dated Aug. 25, 2011 in Korean Application No. 10-2008-0113677, filed Nov. 14, 2008.

Office Action dated Sep. 30, 2014 in Japanese Application No. 2011-236245.

Partial European Search Report dated Jul. 15, 2015 in European Application No. 09826287.6.

* cited by examiner

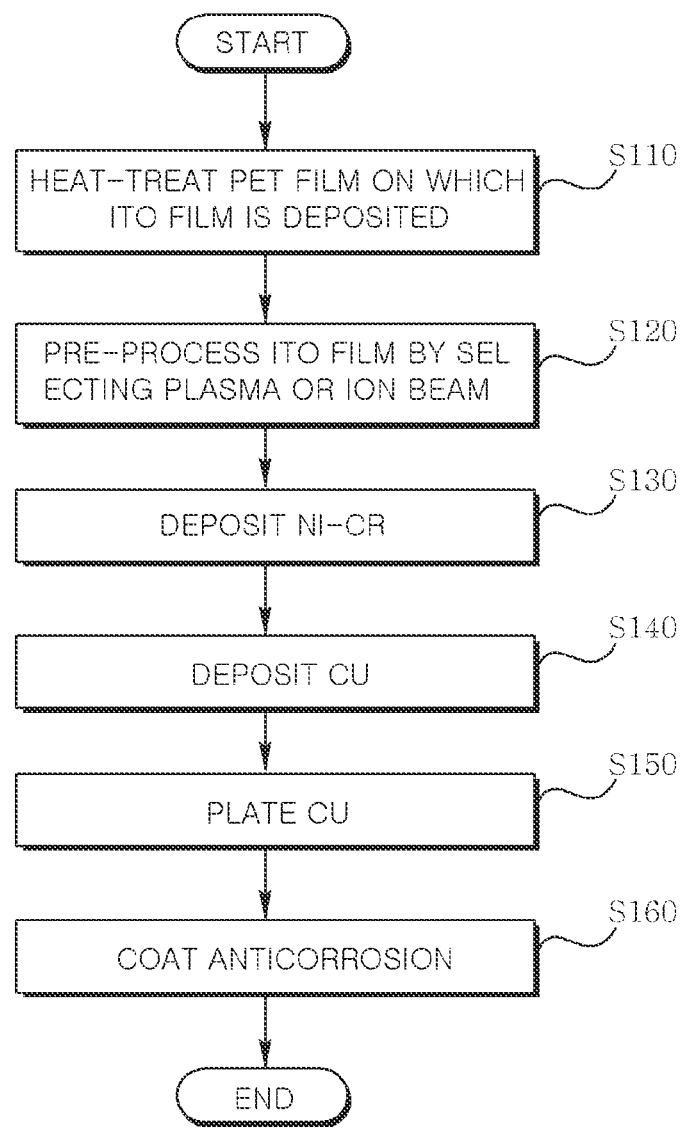

TOUCH SCREEN AND METHOD OF MANUFACTURING THE SAME

CROSS-REFERENCE TO RELATED APPLICATION

This application is the U.S. national stage application of International Patent Application No. PCT/KR2009/006669, filed Nov. 13, 2009, which claims priority to Korean Application No. 10-2008-0113677, filed Nov. 14, 2008, the disclosures of each of which are incorporated herein by reference in their entirety.

TECHNICAL FIELD

The present invention relates to a touch screen and a method of manufacturing the same.

BACKGROUND ART

A touch screen is a device that may detect the approach or touched positions of fingers or a touch pen. The touch screen is mounted on a screen of a video display device so as to be able to easily input information.

The touch screen uses a transparent electrode to detect a touch input by fingers or a pen. The transparent electrode may be formed by disposing a metal layer on a transparent conductive oxide film such as indium tin oxide (ITO).

However, when the metal layer is directly formed on the ITO film, the adhesion of the metal layer is degraded to degrade durability and increase the resistance of the surface of the ITO, thereby degrading the sensitivity of the touch screen.

DISCLOSURE OF INVENTION

An embodiment of the present invention is to provide a touch screen having excellent sensitivity while securing durability and a method of manufacturing the same.

In an embodiment of the present invention, a touch screen is provided, the touch screen comprising: an indium tin oxide (ITO) film deposited on a top surface of a flexible plastic film; a first metal layer deposited on the ITO film; and a second metal layer plated on the first metal layer.

In another embodiment of the present invention, a method of manufacturing a touch screen is provided, the method comprising: heat-treating an ITO film from to prevent the shrinkage thereof; removing and pre-processing impurities on a surface of the ITO film; depositing a first metal layer on the pre-processed ITO film; depositing a second metal layer on the firs metal layer; and plating a third metal layer on the second metal layer.

Advantageous Effects

According to the embodiment of the present invention, the touch screen having the excellent sensitivity while securing durability may be provided and the method of manufacturing the same.

BRIEF DESCRIPTION OF DRAWINGS

The above and other objects and features of the present invention will become apparent from the following description of preferred embodiments taken in conjunction with the accompanying drawings.

FIG. 3 is a flow chart of a method of manufacturing a touch screen according to an embodiment of the present invention.

DETAILED DESCRIPTION

Hereinafter, a touch screen and a method of manufacturing the same according to an embodiment of the present invention will be described in detail with reference to the accompanying drawings. However, if it is determined that the detail description of relevant known functions or components makes subject matters of the present invention obscure, the detailed description thereof will be omitted.

Figure 1:
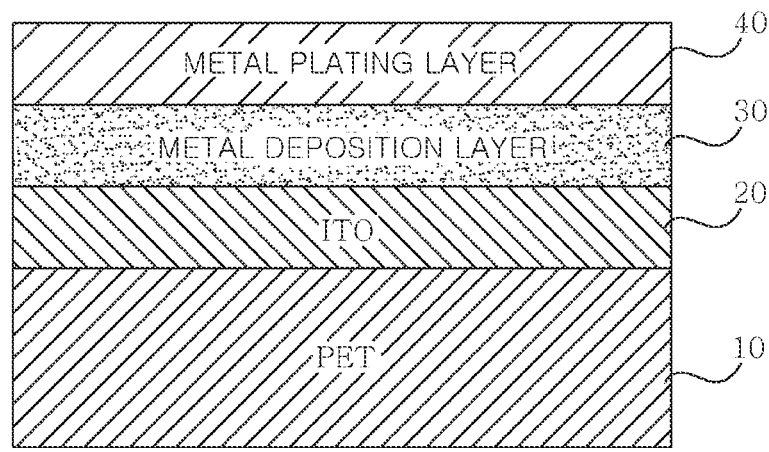
FIG. 1 is a cross-sectional view of a touch screen according to a first embodiment of the present invention.

FIG. 1 is a cross-sectional view of a touch screen according to a first embodiment of the present invention.

As shown in FIG. 1, the touch screen according to the first embodiment of the present invention includes a transparent conductive film 20 such as indium tin oxide, or the like, that is deposited on a top surface of the flexible plastic film 10 and a metal layer 30 and a metal plating layer 40 that are deposited on a transparent conductive film 20.

The flexible plastic film 10 may use a film made of PES, PC, PE, PI, Acryl, or the like. The embodiment of the present invention illustrates a case in which a polyethylene terephthalate (PET) film 10 is used.

In this case, the PET film 10 has shrinkage characteristics in a range of 100 to 150° C. When the PET film 10 on which the transparent conductive film 20 is deposited is used to manufacture the touch screen, there is a problem in that an align is mismatched due to the shrinkage of the PET film 10 at the time of performing heat treatment for a bonding process of upper and lower plates. Therefore, the shrinkage that may occur during a metal layer deposition process and a post-process may be prevented by performing an annealing process that heat-treats the PET film 10 at about 150° C. for 90 minutes to shrink the film in advance.

The ITO film 20 is sequentially provided with a metal plating layer 40 to be used as an electrode and a metal deposition layer 30 for improving the adhesion of the metal plating layer 40. Before the metal deposition layer 30 and the metal plating layer 40 are formed on the ITO film 20, it is preferable to perform the pre-processing process of performing the impurities on the surface by using plasma or ion beams.

The metal deposition layer 30 includes a buffer layer to improve the adhesion between the ITO film 20 and the metal layer and a seed layer for plating a metal. The buffer layer improves the adhesion between the ITO film 20 and the metal layer. Therefore, the buffer layer may be formed by depositing a material such as Ni, Cr, Ni—Cr, Ti, Sn, Mo, or the like. Further, the seed layer is a layer deposited for forming the metal plating layer 40. The seed layer may use a material such as Ag, Cu, Au, and Al.

The metal plating layer 40 may be made of the same material as the seed layer of the metal deposition layer 30 and may be made of a material having excellent conductivity by using an electroplating method, or the like. The metal plating layer 40 may be operated as the electrode of the ITO film 20.

Since the metal deposition layer 30 and the metal plating layer 40 that are a metal layer in the touch screen having the above configuration directly affects the sensitivity of the touch screen, the thickness of the metal deposition layer 30 and the metal plating layer 40 may be controlled so that the resistance value may be controlled to be set to 0.1 Ω/square or less.

Figure 2:
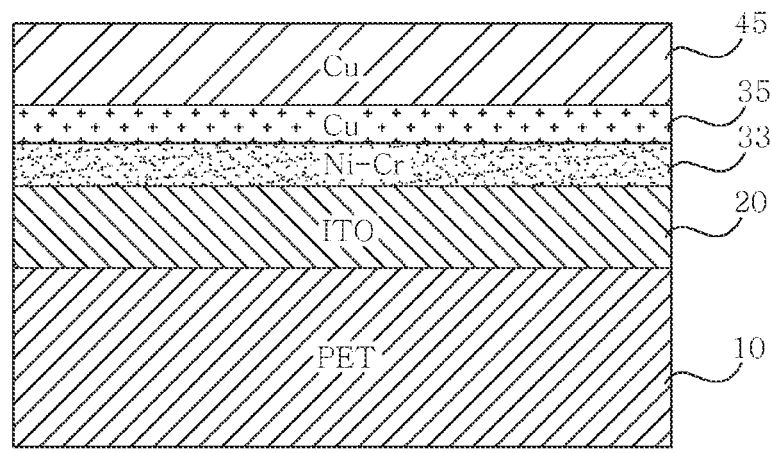
FIG. 2 is a cross-sectional view of a touch screen according to a second embodiment of the present invention.

FIG. 2 is a cross-sectional view of a touch screen according to a second embodiment of the present invention.

As shown in FIG. 2, the touch screen according to the second embodiment of the present invention includes a buffer layer 33 formed by depositing Ni—Cr on the ITO film 20 deposited on the PET film 10, a seed layer 35 formed by forming Cu, and a plated layer 45 formed by plating Cu.

The metal deposition layer 30 directly deposited on the ITO film 20 includes the buffer layer 33 and the seed layer 35 for plating in order to improve the adhesion between the ITO film 20 and the metal layer.

In order to control the resistance value to 0.1 Ω/square or less, the buffer layer 33 may be formed by depositing Ni-Cr at a thickness of 70 Å using a vacuum deposition technology. The seed layer 35 may be formed by depositing Cu at 900 Å using the vacuum deposition technology. Further, the electrode of the touch screen may be formed by depositing Cu on the metal plating layer at a thickness of 8000 Å.

In this case, when depositing the Ni—Cr buffer layer 33 and the Cu seed layer 35, the surface of the ITO film 20 is pre-processed using the method such as the plasma processing, the ion beam irradiation, or the like and then, the metal layer is deposited, such that the damage to the surface of the ITO film 20 may be prevented and the adhesion and the conductivity of the metal layer may be improved.

FIG. 3 is a flow chart of a method of manufacturing a touch screen according to an embodiment of the present invention.

As shown in FIG. 3, when the touch screen is manufactured according to the embodiment of the present invention, the PET film 10 on which the ITO film 20 is deposited is heat-treated (S110).

The surface of the ITO film 20 is pre-processed by using the plasma or the ion beams (S120) in order to improve the adhesion of the metal layer. In this case, reactive gas for generating ion beams may be selected among $O_2$, $O_3$, $N_2$, $N_2O$, $NO_2$, and $CO_2$, and may be selected among inert gases such as Ar, Kr, Xe, and Ne. In addition, the reactive gas or the inert gas may be applied alone or in a mixing state. Further, the irradiation amount of the ion beams may be used within a range of $1\times10^{15}/cm^2 \sim 1\times10^{18}/cm^2$.

The metal deposition layer, the Ni—Cr buffer layer 33 that serves to as the buffer layer is deposited on the pre-processed ITO film 20 (S130). The Ni—Cr buffer layer 33 may be formed by being deposited by the vacuum deposition technology such as RF sputter, DC sputter, CVD, or the like.

The metal deposition layer, the Cu seed layer 35 that serves as the seed layer is deposited on the Ni-Cr buffer layer 33 (S140). The Cu seed layer 35 may be formed by being deposited by the vacuum deposition technology such as RF sputter, DC sputter, CVD, or the like.

When the Cu seed layer 35 is formed, the Cu plating layer 45 that serves as the electrode is plated (S150). The Cu plating layer 45 may be formed by using an electroplating method, or the like.

When the electrode of the touch screen is formed using the Cu plating layer 45, an anticorrosive coating is performed in order to prevent the Cu metal from being oxidized (S160). The anticorrosive coating may be subjected to the coating processing by dipping the Cu plating layer 45 in a corrosion inhibitor.

While the invention will be described in conjunction with exemplary embodiments, it will be understood that present description is not intended to limit the invention to those exemplary embodiments. It will be apparent to those skilled in the art that various modifications and variation can be made in the present invention without departing from the spirit or scope of the invention. Thus, it is intended that the present invention cover the modifications and variations of this invention, provided they come within the scope of the appended claims and their equivalents.

Industrial Applicability

The present invention can provide the touch screen with the excellent sensitivity while securing the durability.

What is claimed is:

1. A touch screen, comprising:
a transparent conductive layer on a substrate;
a first metal layer deposited directly on the transparent conductive layer, the first metal layer including a buffer layer on the transparent conductive layer and a seed layer on the buffer layer; and
a second metal layer formed directly on the seed layer, the second metal layer including the same material as that of the seed layer;
wherein the seed layer is copper, and
wherein the buffer layer comprises Ni-Cr.

2. The touch screen according to claim 1, wherein the substrate comprises a flexible plastic film including at least one material selected from: polyethylene terephthalate (PET);
polyethylene sulfonate (PES); polycarbonate (PC); polyethylene (PE); polyimide (PI); and Acryl.

3. The touch screen according to claim 1, wherein the transparent conductive layer includes indium tin oxide (ITO).

4. The touch screen according to claim 1, wherein the second metal layer is electroplated Cu.

5. A touch screen, comprising:
a transparent conductive layer on a substrate;
a first metal layer deposited directly on the transparent conductive layer, the first metal layer including a buffer layer on the transparent conductive layer and a seed layer on the buffer layer; and
a second metal layer formed directly on the seed layer, the second metal layer including the same material as that of the seed layer;
wherein the seed layer is copper, and
wherein the combined resistance value of the first and second metal layers is 0.1 Ω/square or less.

6. The touch screen according to claim 5, wherein the substrate comprises a flexible plastic film including at least one material selected from: polyethylene terephthalate (PET);
polyethylene sulfonate (PES); polycarbonate (PC); polyethylene (PE); polyimide (PI); and Acryl.

7. The touch screen according to claim 5, wherein the buffer layer comprises Ni—Cr.

8. The touch screen according to claim 5, wherein the transparent conductive layer includes indium tin oxide (ITO).

9. The touch screen according to claim 5, wherein the second metal layer is electroplated Cu.

* * * * *